(12) United States Patent
Strian et al.

(10) Patent No.: US 9,239,080 B2
(45) Date of Patent: Jan. 19, 2016

(54) ROLLING BEARING HAVING A BEARING RING WITH A HARDENED SURFACE ZONE

(71) Applicant: Schaeffler Technologies GmbH & Co. KG, Herzogenaurach (DE)

(72) Inventors: Ernst Strian, Kunreuth (DE); Peter Gebauer, Erlangen (DE); Heiko Schmidt, Muhlhausen (DE); Oliver Graf-Goller, Heroldsberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/379,600

(22) PCT Filed: Mar. 4, 2013

(86) PCT No.: PCT/EP2013/054269
§ 371 (c)(1),
(2) Date: Aug. 19, 2014

(87) PCT Pub. No.: WO2013/139576
PCT Pub. Date: Sep. 26, 2013

(65) Prior Publication Data
US 2015/0036959 A1   Feb. 5, 2015

(30) Foreign Application Priority Data

Mar. 22, 2012   (DE) .......................... 10 2012 204 618

(51) Int. Cl.
*F16C 33/62*   (2006.01)
*F16C 33/64*   (2006.01)
*F16C 19/04*   (2006.01)

(52) U.S. Cl.
CPC ................ *F16C 33/62* (2013.01); *F16C 19/04* (2013.01); *F16C 33/64* (2013.01); *F16C 2360/24* (2013.01); *Y10T 83/04* (2015.04)

(58) Field of Classification Search
CPC .......... F16C 19/04; F16C 33/62; F16C 33/64; F16C 2360/24; Y10T 83/04; C23C 8/23; C23C 38/00
USPC ................ 384/492, 504, 513, 569, 625, 912; 148/206, 316, 325, 326, 405
See application file for complete search history.

(56) References Cited

U.S. PATENT DOCUMENTS 5,165,804 A * 11/1992 Fisher et al. ................... 384/492
5,972,804 A * 10/1999 Tobin et al. .................... 438/786

(Continued)

FOREIGN PATENT DOCUMENTS

DE         19714948         11/1997
DE     102006020078 A1 * 10/2007 .............. F16C 33/32

(Continued)

*Primary Examiner* — Marcus Charles
(74) *Attorney, Agent, or Firm* — Volpe and Koenig, P.C.

(57) ABSTRACT

A rolling bearing (6), in particular for the mounting of the shaft of a turbocharger, which rolling bearing includes a bearing ring (1) and a number of rolling bodies (9). The bearing ring (1) is formed from a steel which comprises, as alloy constituents, 0.05 to 0.65 wt % carbon, 0.5 to 5.0 wt % chromium, up to 1.0 wt % molybdenum, up to 1.0 wt % vanadium, and up to 1.0 wt % aluminum. The surface of the bearing ring (1) has a hardened surface layer (2) which comprises nitrites and which comprises a diffusion layer (3) and a connecting layer (4) situated above said diffusion layer. The surface layer (2) has a thickness of up to 1 mm. The invention also relates to a method for producing a corresponding bearing ring (6).

9 Claims, 2 Drawing Sheets

(56) References Cited

U.S. PATENT DOCUMENTS

| | | | |
|---|---|---|---|
| 6,165,289 A | 12/2000 | Matsumoto et al. | |
| 6,290,398 B1 * | 9/2001 | Fujiwara et al. | 384/625 |
| 6,328,818 B1 * | 12/2001 | Miyagi et al. | 148/232 |
| 6,530,695 B2 * | 3/2003 | Kawamura et al. | 384/492 |
| 7,438,477 B2 * | 10/2008 | Ohki | 384/492 |
| 7,612,380 B2 * | 11/2009 | Son | 257/79 |
| 7,785,531 B2 * | 8/2010 | Rabitsch et al. | 384/912 |
| 8,070,364 B2 * | 12/2011 | Beer et al. | 384/492 |
| 8,292,513 B2 * | 10/2012 | Guenther et al. | 384/569 |
| 2010/0150489 A1 | 6/2010 | Maeda | |
| 2011/0135235 A1 * | 6/2011 | Chriss | 384/523 |

FOREIGN PATENT DOCUMENTS

| | | | |
|---|---|---|---|
| DE | 102008023158 | | 11/2009 |
| DE | 112008001331 | | 4/2010 |
| EP | 0600421 | | 6/1994 |
| EP | 1070760 | | 1/2001 |
| EP | 1489318 | | 12/2004 |
| EP | 1624085 | | 2/2006 |
| JP | 55089456 A | * | 7/1980 |
| JP | 2006009887 A | * | 1/2006 |

* cited by examiner

US 9,239,080 B2

ROLLING BEARING HAVING A BEARING RING WITH A HARDENED SURFACE ZONE

FIELD OF THE INVENTION

The invention relates to a rolling bearing, in particular, for supporting the shaft of a turbocharger, wherein this rolling bearing comprises a bearing ring and a number of rolling bodies. The bearing ring is formed from a steel. The surface of the bearing ring has a hardened surface zone comprising nitrides. The invention further relates to a method for manufacturing a bearing ring for such a rolling bearing.

BACKGROUND

A rolling bearing is used in various technical applications in order to support and guide parts that can move relative to each other, in particular, rotate relative to each other, in machines and to absorb the effective external forces and transfer them to a housing or the like. For example, the shaft of a turbocharger is supported in a motor vehicle with a rolling bearing constructed as a two-row angular contact ball bearing.

A rolling bearing can be exposed to very high stresses during operation as is the case, for example, if used in a modern turbocharger that can reach very high rotational speeds of approximately 300,000 revolutions per minute. Such a rolling bearing must exhibit a reliable operating behavior that is as wear free as possible even under high operating temperatures and at high rolling loading between the rolling bodies and the raceway of a bearing ring.

A bearing ring for such applications is therefore typically produced from an alloyed steel and hardened by an additional heat treatment. DE 10 2008 023 158 A1 discloses, for example, a rolling bearing part, in particular, a bearing ring that is made from a low-alloy steel. The rolling bearing part is operated, in particular, in corrosive environments. Through multiple treatment steps, improved corrosion resistance with sufficient mechanical strength should be achieved for the rolling bearing part. In one treatment step, the surface zone of the bearing ring is hardened by a thermochemical treatment method. Through nitriding or nitrocarburizing that is not described in more detail, a hard surface zone with a thickness of 15 to 25 µm is generated. The thickness of this surface zone, however, is not sufficient especially for the bearing ring of a rolling bearing that is exposed to very high loads like those that occur, for example, in the support of the shaft of a turbocharger.

SUMMARY

The present invention is based on the objective of creating a rolling bearing, in particular, for supporting a shaft of a turbocharger that has a surface that is as resistant as possible and has high wear resistance and hardness with very economical production. The problem of the invention is also to disclose an economical method for producing such a bearing ring.

The objective with respect to creating a rolling bearing is solved according to the invention. Advantageous embodiments and improvements of the invention are explained in the dependent claims and the following description.

Accordingly, the rolling bearing according to the invention comprises, especially for the support of a shaft of a turbocharger, a bearing ring and a number of rolling bodies. The bearing ring is made from a steel that comprises, as alloy components, 0.05 to 0.65 wt. % carbon, 0.5 to 5.0 wt. % chromium, up to 1.0 wt. % molybdenum, up to 1.0 wt. % vanadium, and up to 1.0 wt. % aluminum. The surface of the bearing ring has a hardened surface zone comprising nitrides with a diffusion layer and a connection layer above this diffusion layer. The surface zone has a thickness of up to 1 mm.

The invention starts from the consideration that a rolling bearing must be designed and formed to the extent that it fulfills the strict requirements placed on each use case with the most economical production possible. The invention further starts from the consideration that the production costs for a corresponding rolling bearing can be significantly reduced if a relatively economical semi-finished product and an easy-to-perform heat treatment that moreover does not make expensive mechanical rework necessary are used for the production. Therefore the invention discloses using a semi-finished product made from a relatively economical, low-alloy steel instead of an expensive basic material and to subject this to thermochemical treatment acting only on the surface of the part according to the corresponding shaping, in order to selectively "adjust" the required mechanical component properties for the actual use case over a resulting hardened surface zone having a certain thickness. The combination of base material of the semi-finished product and the thickness of the surface zone adapted to the use case thus allows a very economical production under generating the required mechanical component properties.

The rolling bearing can be a standard shape, for example, a self-aligning ball bearing, an angular contact ball bearing, cylindrical roller bearings, or tapered roller bearings, as well as a special shape. The bearing can be, in particular, a multiple-row rolling bearing. Accordingly, the rolling bodies can be formed, for example, as balls, cylinders, or cones and have, in particular, a diameter of up to 5 mm. The bearing ring can be either an outer ring or an inner ring of a rolling bearing. It is also possible that both the outer ring and also the inner ring of a rolling bearing are formed as such a bearing ring. Here, the bearing ring can have a one-piece or split design. It is also possible, in particular, that the bearing ring is an integral part of a shaft.

In addition to the alloy components mentioned above, the steel can also comprise, in particular, the alloy element boron, by which the iron properties of the steel can be adjusted.

The surface zone can comprise the entire surface of a bearing ring. Alternatively, it is also possible that the surface zone is present only in certain areas of the surface of a bearing ring.

The nitrides are generated by a thermochemical treatment, in particular, by nitriding or nitrocarburizing. Here, classified according to the donor medium, gas nitriding, bath nitriding, or plasma nitriding or a corresponding nitrocarburizing method can be used. They all have in common that nitrogen or nitrogen and carbon are present within a donor medium in a compound that is split in a reaction chamber. During nitriding, the surface of the bearing ring is enriched with nitrogen. During nitrocarburizing, additional carbon diffuses into the surface. In particular, the nitrogen reacts with the iron contained in the steel to form iron nitrides and with existing alloy elements to form special nitrides or for additional diffusion of carbon to form the corresponding carbonitrides. Such nitrides have a high hardness. Therefore, a hardened surface zone is formed that comprises a diffusion layer and a connection layer above this diffusion layer.

The connection layer is formed of alloy elements that are present after nitriding predominantly from iron nitrides and special nitrides that are incorporated into the iron nitride matrix. The diffusion layer contains, as essential characteristics, deposited special nitrides of alloy elements. After nitrocarburizing, the connection layer is formed primarily from iron carbonitrides and special carbonitrides of present alloy elements that are incorporated into the iron carbonitride matrix. The diffusion layer contains, as essential characteristics, deposited special (carbo)nitrides of present alloy elements. The deposition of the special nitrides or special carbonitrides is triggered when the nitrogen concentration reached by diffusion of the nitrogen into the interior exceeds the solubility for each nitride in the iron. The connection layer has, in particular, very high hardness. The diffusion layer distinguishes itself, in particular, by its high strength and hardness and has higher durability compared with the connection layer.

The thickness of the surface zone is up to 1 mm and corresponds to approximately the diffusion depth of the incorporated nitrogen that is dependent, in particular, on the duration and the temperature of the thermochemical treatment. The surface of a bearing ring with such a surface zone has the hardness and strength sufficient for operation of a corresponding rolling bearing.

The specified rolling bearing has the advantage of having, with very economical production, a surface that is as resistant as possible with high wear resistance. For a surface zone that is up to 1 mm thick, the rolling bearing has a sufficiently high wear resistance and hardness, in order to also provide, under high loads, in particular, high rotational speeds of a supported shaft, a reliable operating behavior. In addition, for generating a surface zone of this thickness, only relatively short heat treatment times and relatively low temperatures are needed. This further has favorable effects on the dimensional stability and structure formation. Only very small dimensional and shape changes occur, which consequently make it necessary to perform no or only correspondingly little rework.

Advantageously, the surface zone has a thickness of 100-300 μm. A surface zone of this thickness represents an especially good compromise between production costs and high wear resistance and hardness.

In one advantageous embodiment, the surface zone has a Vickers hardness of greater than 700. The Vickers hardness is a common measure for the hardness of surfaces. The hardness test named after the British aircraft company Vickers is used especially for hard materials with uniform structure and also for surface-hardened workpieces. In this form of the hardness test, the tip of an equilateral pyramid (with an opening angle of 136°) made from diamond is pressed into the surface of a sample and the diagonals of the resulting indentation are measured. For a Vickers hardness of greater than 700 for the surface zone, the bearing ring exhibits good resistance especially with respect to abrasive wear. Here, the maximum hardness is present directly on the surface and the hardness decreases toward the interior.

Preferably, the bearing ring comprises a raceway area, wherein the surface zone in the raceway area is free from a connection layer. The raceway area is here essentially the surface of the bearing ring that is in direct contact at least partially with the surface of the rolling body in the installed state. The connection layer typically has a very high hardness and thus, along with that, also very low ductility. Therefore, this brittle connection layer can easily fracture under corresponding loading. Because very large point loads or linear loads are often generated in the rolling bearing between the raceway area and rolling bodies, it is preferable to form the raceway area of the bearing ring without a connection layer. This can be removed, in particular, through grinding or honing.

The steel advantageously comprises 0.27 to 0.34 wt. % carbon, 2.3 to 2.7 wt. % chromium, 0.15 to 0.25 wt. % molybdenum, and 0.1 to 0.2 wt. % vanadium. This steel is also managed under the designation "31CrMoV9" and is a so-called nitriding steel. In particular, it is alloyed with the elements chromium, molybdenum, and vanadium that represent very good nitride formers. Such a steel is therefore particularly well suited for generating a surface zone with the required hardness and strength on the surface of the bearing ring. It is also relatively economical.

After the hardening, the surface zone preferably has a dark gray color coating. Thus, the surface of the bearing ring comprising a surface zone has a dark gray color coating after the thermochemical treatment.

In one advantageous embodiment, the rolling bearing is formed as a two-row angular contact ball bearing. Accordingly, the rolling bodies are formed here as balls. The rolling bodies are formed, in particular, from a ceramic material. A two-row angular contact ball bearing can handle large loads in the axial and radial directions. The bearing ring can be an outer ring or an inner ring of the two-row angular contact ball bearing. Alternatively, it is also possible that both the outer ring and also the inner ring are formed as such a bearing ring. Here, the bearing ring can be constructed in one piece or split.

The objective directed toward a method for producing a bearing ring is met by the features of the invention. Advantageous embodiments and improvements of the invention are explained in the dependent claims and the following description.

In the method for producing a bearing ring for a rolling bearing, in particular, for supporting a shaft of a turbocharger, the bearing ring is made from a steel that comprises, as alloy components, 0.05 to 0.65 wt. % carbon, 0.5 to 5.0 wt. % chromium, up to 1.0 wt. % molybdenum, up to 1.0 wt. % vanadium, and up to 1.0 wt. % aluminum. Here, nitrides are generated in a surface zone on the surface of the bearing ring by a thermochemical treatment, so that a diffusion layer and a connection layer above this diffusion layer are formed. Here, a surface zone with a thickness of up to 1 mm is generated.

In addition to the alloy components mentioned above, the steel can also contain, in particular, the alloy element boron by which the profile of properties of the steel can be adjusted.

The bearing ring can be shaped and dimensioned from a semi-finished product of the corresponding steel through forging and through metal-cutting processing, for example, through turning, milling, or grinding. Advantageously, a so-called nitriding steel is used, in particular, a steel with the designation "31CrMoV9". Such a steel comprises, as alloy components, 0.27 to 0.34 wt. % carbon, 2.3 to 2.7 wt. % chromium, 0.15 to 0.25 wt. % molybdenum, and 0.1 to 0.2 wt. % vanadium.

To generate the nitrides in a surface zone on the surface of the bearing ring, nitrogen atoms or nitrogen atoms and carbon atoms are introduced by a thermochemical treatment process, in particular, by nitriding or nitrocarburizing. For nitriding, the surface of a material is enriched with nitrogen. For nitrocarburizing, additional carbon diffuses into the surface. Here, for example, gas nitriding, bath nitriding, or plasma nitriding or the corresponding nitrocarburizing can be performed.

Here, for nitriding, a medium producing nitrogen and, for nitrocarburizing, a medium producing nitrogen and carbon is introduced together with the bearing ring into a reaction chamber. The bearing ring is then exposed to a thermal cycle with a heating phase, holding phase, and cooling phase. This thermal cycle is run under the use of the medium producing nitrogen or nitrogen and carbon or several corresponding media. Here, the nitrogen compounds or the nitrogen and carbon compounds are split and the free nitrogen atoms or nitrogen and carbon atoms diffuse into the surface of the bearing ring. The nitrogen here reacts with the iron contained in the steel to form iron nitrides and with present alloy elements to form special nitrides. Here, the surface zone that has a thickness of up to 1 mm and comprises a diffusion layer and a connection layer above the diffusion layer. The connection layer and the diffusion layer have the characteristics and properties already mentioned above.

The method shown has the advantage of an economical and simple manufacturing process for a bearing ring. The generation of a surface zone with a thickness of up to 1 mm is possible within relatively short heat treatment times and at low temperatures and here only very low dimensional and shape changes, which moreover makes necessary no or only a correspondingly minimal amount of rework.

Advantageously, a surface zone with a thickness of 100-300 μm is generated. A surface zone of this thickness has an especially good compromise between production costs and high wear resistance and hardness.

In a preferred implementation of the method, the nitrides are generated in a thermochemical method at a temperature between 400° C. and 700° C. over a time period of up to 50 hours. In particular, a nitriding process, that is, an introduction of nitrogen atoms, is performed with these process parameters. Nitrocarburizing, that is, an introduction of nitrogen atoms and carbon atoms, is preferably performed at a temperature between 520° C. and 630° C. over a time period of, for example, up to 28 hours. For each of these temperature ranges and process times, the nitrogen atoms can diffuse sufficiently deep into the material and thus generate a surface zone with the necessary thickness of up to 1 mm. Thus, during nitrocarburizing, lower temperatures occur than during nitriding. This benefits the dimensional stability of the rolling bearing, because, for example, for high rotational speed bearings, such as turbocharger bearings, their dimensions absolutely require small tolerance ranges.

Advantageously, the bearing ring is tempered before the thermochemical treatment. During this tempering, the bearing ring is heated selectively to a tempering temperature and held at this tempering temperature for a certain period before it is cooled again. This is used, in particular, to eliminate internal stresses and reduces warping of the bearing ring during the subsequent thermochemical treatment. Here, as the tempering temperature, advantageously at least the temperature that is used for the subsequent thermochemical treatment is selected.

Advantageously, the connection layer is removed in a raceway area with a metal cutting process. This relatively brittle connection layer can fracture easily, especially for point loads or linear loads occurring between the rolling bodies and the raceway of the bearing ring. The connection layer is removed, in particular, by grinding or honing. During grinding, the tool that is, in particular, a grinding disk with a plurality of bonded grinding grains, rotates at a high rotational speed and separates the connection layer. During honing, the removal of the connection layer is performed by grinding agents combined in machine hones. Here, a rotational movement and an oscillating longitudinal movement take place between the honing tool and the bearing ring.

BRIEF DESCRIPTION OF THE DRAWINGS

Embodiments of the invention are described in more detail below with reference to a drawing. Shown are.

DETAILED DESCRIPTION OF THE PREFERRED EMBODIMENTS

Figure 1:
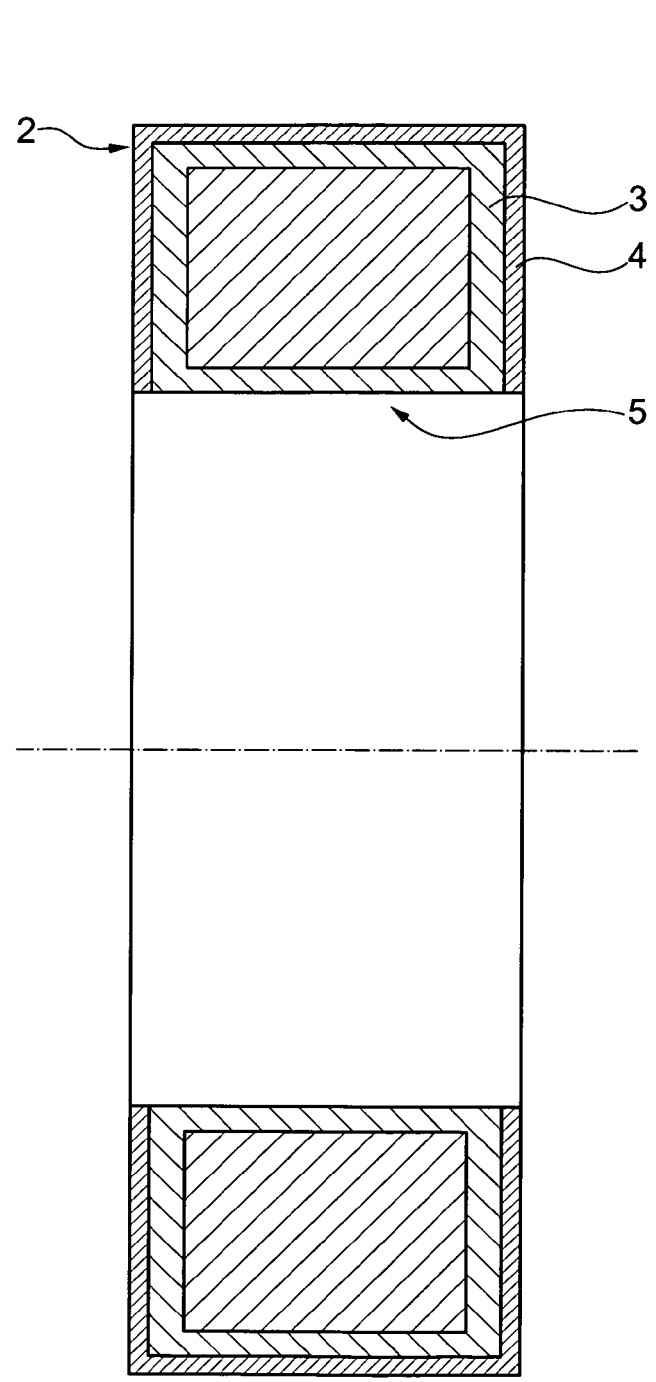
FIG. 1 an embodiment of an outer ring in a schematic section view, and FIG. 2 an embodiment of a rolling bearing in its installed state in a schematic section view.

In FIG. 1, an embodiment of an outer ring 1 is shown in a section. The outer ring 1 is formed in shape and dimensions from a semi-finished product of a steel with the designation "31CrMoV9" through forging and turning. The steel "31CrMoV9" is alloyed, in particular, with the elements chromium, molybdenum, and vanadium that are very good nitride formers.

The surface of the outer ring 1 has a hardened surface zone 2 that comprises a diffusion layer 3 and a connection layer 4 above this diffusion layer. This surface zone 2 has been generated by gas nitriding.

For this purpose, the outer ring 1 is exposed in a nitriding furnace to an ammonia gas atmosphere at a temperature of 560° C. over a period of 40 hours. Here, the cracked nitrogen of the ammonia gas is diffused into the surface of the outer ring 1 and reacts with the iron in the steel to form iron nitrides and with the alloy elements to form special nitrides. The diffusion layer 3 generated in this way has a thickness of 250 μm and distinguishes itself, in particular, by a high strength and hardness. The generated, very hard connection layer 4 has a thickness of 10 μm. The surface zone 2 thus has a thickness of 260 μm. The relatively low temperature of 560° C. needed for generating a surface zone 2 of this thickness over a heat treatment time of 40 hours produces a very small dimensional and shape change of the outer ring 1 during this heat treatment.

Directly on the surface, the surface zone has a Vickers hardness of greater than 700. At this hardness, the outer ring 1 has good stability, in particular, with respect to abrasive wear. In the raceway area 5, the relatively brittle connection area 4 has been removed by grinding. Therefore, the thickness of the surface zone 2 in this area is 250 μm.

Figures 2, 3:
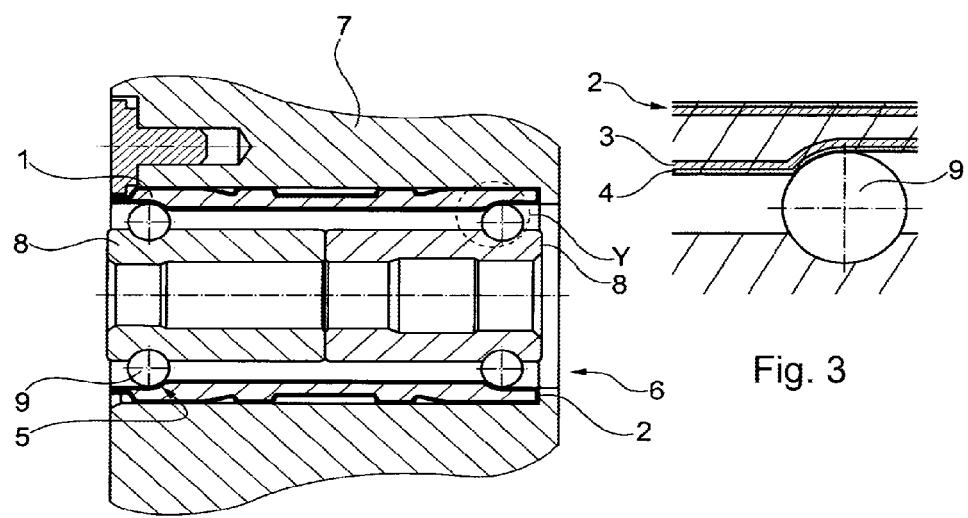
FIG. 3 shows a magnified view of the rolling bearing of FIG. 2 in the "Y" area.
Parts that correspond to each other are provided with the same reference symbols in both figures.

FIG. 2 shows a two-row angular contact ball bearing 6 in its installed state in a section. The two-row angular contact ball bearing 6 is inserted in a housing 7 for the rotating support of a shaft (not shown). The tapered rolling bearing has an outer ring 1 and a split inner ring 8. Between the inner ring 8 and the outer ring 1 there are balls 9. The balls 9 are combined with a cage (not shown) to form a roller cage. Therefore, the balls 9 are held at a uniform distance and contact on the opposite sides is prevented. FIG. 3 shows a magnified view from the "Y" area of FIG. 2 of the two-row angular contact ball bearing 6.

The outer ring 1 corresponds to the outer ring shown in FIG. 1. In the raceway area 5, the 10-μm thick connection layer 4 has been removed, wherein the surface zone 2 is 250 μm in this area. On the remaining surface of the outer ring 1 there is a 260-μm thick surface zone 2. Due to this 250 μm or 260 μm thick surface zone 2, the surface of the outer ring 1 of the shown angular contact ball bearing 6 has sufficient wear resistance, in order to exhibit a reliable operational behavior even under high loads, and especially high rotational speeds.

LIST OF REFERENCE NUMBERS

1 Outer ring
2 Surface zone

3 Diffusion layer
4 Connection layer
5 Raceway area
6 Angular contact ball bearing
7 Housing
8 Inner ring
9 Ball

The invention claimed is:

1. Rolling bearing comprising a bearing ring and a number of rolling bodies, wherein the bearing ring is formed from a steel that comprises, as alloy components, 0.05 to 0.65 wt. % carbon, 0.5 to 5.0 wt. % chromium, more than 0% and up to 1.0 wt. % molybdenum, more than 0% and up to 1.0 wt. % vanadium, and more than 0% and up to 1.0 wt. % aluminum, wherein a surface of the bearing ring has a hardened surface zone that comprises nitrides and has a diffusion layer and a connection layer above said diffusion layer, the surface zone has a thickness of up to 1 mm, and the bearing ring comprises a raceway area and the surface zone is free from the connection layer in the raceway area.

2. The rolling bearing according to claim 1, wherein the surface zone has a thickness of 100-300 μm.

3. The rolling bearing according to claim 1, wherein the surface zone has a Vickers hardness of greater than 700.

4. The rolling bearing according to claim 1, wherein the steel comprises 0.27 to 0.34 wt. % carbon, 2.3 to 2.7 wt. % chromium, 0.15 to 0.25 wt. % molybdenum, and 0.1 to 0.2 wt. % vanadium.

5. The rolling bearing according to claim 1, wherein the bearing is formed as a two-row angular contact ball bearing.

6. Method for producing a bearing ring for a rolling bearing comprising producing, the bearing ring from a steel that comprises, as alloy components, 0.05 to 0.65 wt. % carbon, 0.5 to 5.0 wt. % chromium, more than 0% and up to 1.0 wt. % molybdenum, more than 0% and up to 1.0 wt. % vanadium, and more than 0% and up to 1.0 wt. % aluminum, generating nitrides in a surface zone on a surface of the bearing ring by a thermochemical treatment, so that a diffusion layer and a connection layer above said diffusion layer are formed, the surface zone is generated with a thickness of up to 1 mm, and the connection layer of the bearing ring is removed in a raceway area.

7. The method according to claim 6, wherein the surface zone is generated with a thickness of 100-300 μm.

8. The method according to claim 6, wherein the nitrides are generated at a temperature between 400° C. and 700° C. over a time period of up to 50 hours.

9. The method according to claim 6, wherein the connection layer of the bearing ring is removed in the raceway area by metal-cutting.

* * * * *